S. R. DUMMER.
PACKING FOR CAR AXLES AND BOXES.

No. 80,465. Patented July 28, 1868.

Witnesses
George C. Johnson
Frederick Hess

Inventor
Saml. R. Dummer

United States Patent Office.

SAMUEL R. DUMMER, OF NEW YORK, N. Y.

*Letters Patent No. 80,465, dated July 28, 1868.*

---

IMPROVED PACKING FOR CAR-AXLES AND BOXES.

---

The Schedule referred to in these Letters Patent and making part of the same.

---

TO ALL WHOM IT MAY CONCERN:

Be it known that I, SAMUEL R. DUMMER, of the city, county, and State of New York, have invented a new and improved "Packing for Railroad-Car and other Axles;" and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The present invention relates more particularly to the packing of railroad-car axles, although it may be adapted to the packing used for other axles.

And the invention consists,

In applying to the axle a packing, whose periphery is grooved so as to receive a V-shaped lining, which acts as a wedge against the grooved sides of packing, through the pressure of an elastic encircling-band on said lining, whereby the packing is spread out, as it were, against the sides of the lubricating-chamber in which the packing is placed, and thus prevent the passage of dust, dirt, &c., to the lubricating-box.

In the accompanying plate of drawings, my "improvements in packing" are illustrated—

Figure 1:
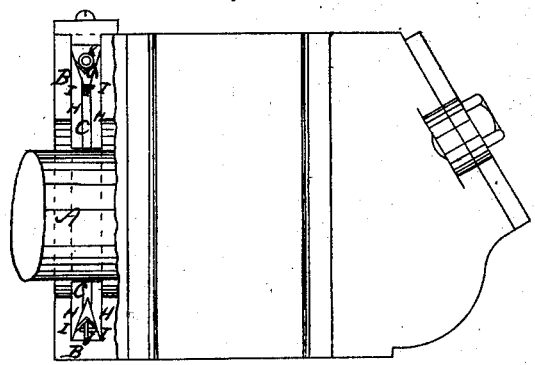

Figure 1 being a side view of the lubricating or journal-box, with its chamber containing the packing, in vertical section.

Figure 2:
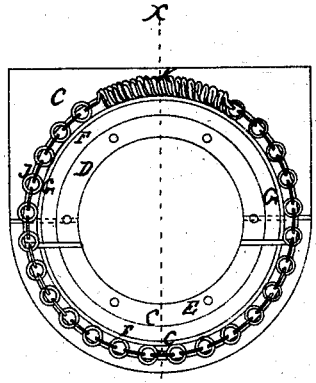

Figure 2, a section, taken through the centre of the packing, in a plane parallel with its faces or sides.

Figure 3:
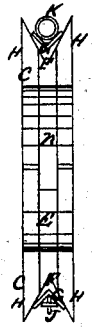

Figure 3, a transverse vertical section, taken in the plane of the line $x\ x$.

A, in the drawings, represents a car-axle, and B the chamber of the lubricating or journal-box, in which the packing C for the axle is placed and confined. This packing C, in the present instance, is made of leather, and in two parts or sections, D and E, which are joined together by a tongue and groove.

F, a groove around the packing C, and G a sheet-metal lining to the groove F. This lining is made of a V-shape, so that, as it is pressed into the groove F, it will throw out, as it were, the sides or faces H of the packing against the sides I to the chamber B, and thereby close the packing about the chamber B to the passage of dirt, dust, &c., through the said chamber B to the chamber of the lubricating or journal-box in which the oil or other lubricating-medium is placed. This lining is made in sectional pieces, corresponding to the divisions of the packing.

J, a chain, partially encircling the packing C, with its two ends joined by a spiral or coiled spring, K, by means of which the chain is caused to bind or press upon the packing with a yielding, elastic, and flexible pressure, confining it to the axle sufficiently to close the packing to the passage of dust, dirt, &c., through it, around the axle, to the lubricating or journal-box or chamber.

In lieu of using a chain, with a spring-connection, as above described, a cord, string, wire, or other line, may be employed, or a continuous encircling elastic India-rubber band.

From the above detailed description of my improvements, it is apparent that the many advantages hereinbefore stated are secured, and a packing obtained which is in every respect perfectly closed to the passage of dirt, dust, &c., through both its joints with the axle and with the lubricating or journal-box, to the oil or other lubricating-material within the latter, the importance of which is obvious.

What I claim as my invention, and desire to have secured to me by Letters Patent, is—

1. The V-shaped lining G, bearing against the grooved packing C, and supporting the partly-yielding and non-yielding encircling line J K, substantially as herein represented and described.

2. The combination of the grooved sectional packing C D E, the V-shaped lining G, the encircling-chain J, and its yielding connection K, substantially as and for the purpose described.

SAML. R. DUMMER.

Witnesses:
    ALBERT W. BROWN,
    WM. O. SHAW.